(12) United States Patent
Bittle et al.

(10) Patent No.: US 8,177,971 B2
(45) Date of Patent: May 15, 2012

(54) FILTER ASSEMBLY

(75) Inventors: Thomas S. Bittle, Newcastle Upon Tyne (GB); Brian Lane, S. Russell, OH (US)

(73) Assignee: Parker Hannifin Limited, Hemel Hempstead (GB)

(*) Notice: Subject to any disclaimer, the term of this patent is extended or adjusted under 35 U.S.C. 154(b) by 155 days.

(21) Appl. No.: 12/691,366

(22) Filed: Jan. 21, 2010

(65) Prior Publication Data

US 2010/0154371 A1   Jun. 24, 2010

Related U.S. Application Data

(63) Continuation of application No. PCT/GB2008/002611, filed on Jul. 31, 2008.

(30) Foreign Application Priority Data

Aug. 4, 2007 (GB) .................................. 07157247.3

(51) Int. Cl.
*B01D 46/00* (2006.01)
*B01D 35/30* (2006.01)

(52) U.S. Cl. ............ 210/232; 55/478; 55/498; 55/502; 55/504; 210/443; 210/444; 210/497.01

(58) Field of Classification Search .................... 55/498, 55/502, 503, 504, 478, 480, 495, DIG. 17; 210/443, 444, 497.01, 232, 455

See application file for complete search history.

(56) References Cited

U.S. PATENT DOCUMENTS 3,954,428 A   5/1976   Marple et al.
(Continued)

FOREIGN PATENT DOCUMENTS

BE   1011567 A3   11/1999
(Continued)

OTHER PUBLICATIONS

Machine translation of DE 10052524, published Apr. 25, 2002.*

(Continued)

*Primary Examiner* — Robert Clemente
(74) *Attorney, Agent, or Firm* — Christopher H. Hunter (57) ABSTRACT

A filter assembly for removing material entrained in a fluid stream includes a housing having a head part and a body part, and inlet and outlet ports for the fluid that is to be filtered, in which at least one of the ports is provided in the head part, the head part having a chamber port fluidly connected to the at least one port in the head part, the head and body parts having first formations which enable them to be connected to one another and separated by relative rotation. The assembly includes a filter element for removing material entrained in the fluid stream that can be received in the body part, the filter element and body part having second formations which restrict relative rotation between them, the filter element having a filter port, in which a fluid tight connection can be provided between the filter port and the chamber port by sliding one of them into the other along a first axis. One of the head part and the filter element provides an inclined surface which is inclined relative to the first axis, and the other provides an ejector part which can act against the said inclined surface so as to push the filter element away from the head part as the head part and the body part are separated by relative rotation, so as to free the filter port from the chamber port.

16 Claims, 9 Drawing Sheets

U.S. PATENT DOCUMENTS

| | | | | |
|---|---|---|---|---|
| 4,774,853 | A * | 10/1988 | Takahashi | 74/606 R |
| 4,877,521 | A * | 10/1989 | Petrucci et al. | 210/171 |
| 4,915,831 | A * | 4/1990 | Taylor | 210/232 |
| 4,948,505 | A * | 8/1990 | Petrucci et al. | 210/238 |
| 5,114,572 | A | 5/1992 | Hunter et al. | |
| 5,186,829 | A | 2/1993 | Janik | |
| 5,336,406 | A * | 8/1994 | Stanford et al. | 210/235 |
| 5,456,830 | A * | 10/1995 | Stanford et al. | 210/235 |
| 5,486,288 | A * | 1/1996 | Stanford et al. | 210/235 |
| 5,826,854 | A * | 10/1998 | Janvrin et al. | 251/149.9 |
| 6,458,269 | B1 * | 10/2002 | Bassett et al. | 210/119 |
| 6,533,933 | B1 * | 3/2003 | Stankowski et al. | 210/232 |
| 6,695,891 | B2 * | 2/2004 | Reid | 55/495 |
| 6,977,006 | B2 * | 12/2005 | Reid | 55/495 |
| 7,022,228 | B2 | 4/2006 | Hennes et al. | |
| 7,395,936 | B2 | 7/2008 | Knight | |
| 7,407,148 | B2 | 8/2008 | Bassett et al. | |
| 7,445,710 | B2 * | 11/2008 | Stankowski et al. | 210/232 |
| 7,476,314 | B2 | 1/2009 | Reid | |
| 7,494,017 | B2 | 2/2009 | Miller | |
| 2003/0141235 | A1 * | 7/2003 | Stankowski et al. | 210/232 |
| 2006/0065607 | A1 | 3/2006 | Bassett et al. | |
| 2006/0186031 | A1 | 8/2006 | Fick et al. | |
| 2007/0095744 | A1 | 5/2007 | Bagci et al. | |

FOREIGN PATENT DOCUMENTS

| | | |
|---|---|---|
| DE | 199 05 601 A1 | 8/2000 |
| DE | 100 52 524 A1 | 4/2002 |
| EP | 0 081 826 B1 | 5/1988 |
| EP | 1 708 798 B1 | 4/2009 |
| GB | 2 290 486 A | 1/1996 |
| WO | 2005/061073 A1 | 7/2005 |
| WO | 2005/115581 A1 | 12/2005 |
| WO | 2006/001333 A1 | 2/2006 |
| WO | 2009/019442 A1 | 2/2009 |
| WO | 2009/019443 A1 | 2/2009 |

OTHER PUBLICATIONS

Search Report under Section 17, dated Dec. 4, 2007 from the Great Britain Patent Office in related Great Britain Patent Application No. GB0715259.7.

Notification of Transmittal of The International Search Report and Written Opinion, dated Nov. 25, 2008, in related International Application No. PCT/GB2008/002608 (WO2009/019442A1).

Notifcaton of Tansmital of The Internatonal Preliminar Report on Patentability, dated Nov. 11, 2009, in related International Application No. PCT/GB2008/002608 (WO2009/019442A1).

Corresponding Priority Application No. GB0715247.3 Search Report under Section 17 dated Dec. 3, 2007 from the Great Britain Patent Office.

Notification of Transmittal of The International Search Report and Written Opinion, dated Nov. 20, 2008, in corresponding priority International Application No. PCT/GB2008/002611 (WO 2009/018443A1).

Notification of Transmittal of The International Preliminary Report on Patentability, dated Nov. 5, 2009. in corresponding priority International Patent Application No. PCT/GB2008/002611 (WO 2009/018443A1).

\* cited by examiner

FIG. 9

FILTER ASSEMBLY

CROSS REFERENCE TO RELATED APPLICATIONS

This application is a continuation of co-pending International Application No. PCT/GB2008/002611 filed Jul. 31, 2008, which application designated the United States, and which application claims priority to Great Britain Application No. 07157247.3, filed Aug. 4, 2007, the disclosure of each of which is incorporated herein by reference.

TECHNICAL FIELD

This invention relates to a filter assembly for removing material that is entrained in a fluid stream.

BACKGROUND OF THE INVENTION

Filtration of a fluid, such as a gas in a compressed gas system is generally required so that the fluid is sufficiently free of contaminants (liquid, solid or gaseous) for a subsequent application or to minimise adverse effects of contaminants on components of the system. For example, removal of compressor oil from a compressed gas stream can be required to minimise chemical contamination and accumulation on valves which might lead to malfunction of the valves. It is known to treat a fluid stream to remove contaminants (liquid, solid or gaseous) by filtering the fluid stream, using a filter element, also known as a coalescing filter. It is also known to treat a fluid stream by imparting a helical flow to fluid entering the filter assembly, using a flow director, so that centrifugal forces causes separation of bulk liquid or solids, such as water, from the stream.

A filter device, such as a filter element or a flow director, used for such filtration or separation can require maintenance and replacement. In particular, filter elements have a limited lifetime and the accumulation of contaminants with prolonged use gives rise to unacceptable pressure drop, which can lead to reentrainment of the contaminants in the fluid stream. It is therefore necessary to replace the filter element from time to time.

Filter assemblies typically comprise a housing comprising head and body parts, and a filter element which can be fitted within the housing. Such filter elements commonly have a wall of a filtration medium and an end cap with an inlet which can be sealed to the head part of the housing to provide a flow path for a fluid stream to be supplied to the space within the filter element. The inlet is provided by a port on an end cap of the element. The port has an O-ring seal on its external surface which is received in a bore within the housing end cap, in which it is compressed to form a seal.

The filter element is assembled in the housing by locating the port on the element end cap in the bore in the housing head part. The O-ring seal is compressed as a result of this, so that a seal is formed between the bore in the housing head part and the element. The head and body parts of the housing can then be connected together by means of cooperating screw threads.

The head and body parts of the housing are separated in order to gain access to the filter element when it has to be replaced. The frictional engagement between the O-ring seal and each of the bore in the housing head part and the flow conduit on the element end cap means that the filter element remains attached to the housing head part when the housing body part is removed. This effect in a compressed O-ring seal is sometimes referred to as "stiction". The element has to be gripped in order to separate it from the housing head part. This can involve gripping the filter media. The media can often be loaded with collected oil and other impurities, which can give rise to cleanliness and contamination or safety issues for the user.

SUMMARY OF THE INVENTION

The present invention provides an improved filter assembly in which the filter element is pushed out of the head part as the head and body parts are rotated relative to each other.

Accordingly, in one aspect, the invention provides a filter assembly for removing material entrained in a fluid stream, comprising:

a housing having a head part and a body part, and inlet and outlet ports for the fluid that is to be filtered, in which at least one of the ports is provided in the head part the head part having a chamber port fluidly connected to the at least one port in the head part, the head and body parts having first formations which enable them to be connected to one another and separated by relative rotation;

a filter element for removing material entrained in the fluid stream that can be received in the body part, the filter element and body part having second formations which restrict relative rotation between them, the filter element having a filter port, in which a fluid tight connection can be provided between the filter port and the chamber port by sliding one of them into the other along a first axis;

in which one of the head part and the filter element provides an inclined surface which is inclined relative to the first axis, and the other provides an ejector part which can act against the said inclined surface can act so as to push the filter element away from the head part as the head part and the body part are separated by relative rotation, so as to free the filter port from the chamber port.

The assembly of the invention has the advantage that the filter element is pushed out of the housing head part when the housing body part is rotated relative to the housing head part. This can overcome any frictional or stictional engagement between the filter element and the housing head part, for example between an O-ring seal, and either or each of the chamber port in the housing head part and the filter port on the filter element between which the O-ring is compressed. Accordingly, the filter element can be removed from the housing head part together with the housing body part, without having to touch the filter element directly. This can mean that an individual who has to disengage a used filter element from the housing can do so without having to touch the filter element.

References herein to the filter port being free from the chamber port means that there is substantially little or no frictional or stictional engagement between them that restricts their separation. Preferably, the filter port is able to drop out of the chamber port under the weight of the filter element alone. Accordingly, it is not necessary for the filter port to be completely removed from the chamber port for it to be free. Indeed, the shape and dimensions of the chamber port and the filter port could be such that one of them can be partially located within the other while still being free.

The fluid tight connection between the filter port and the chamber port can be provided by a sealing element which extends between the filter port and chamber port when assembled. Preferably, the sealing element is an O-ring which is compressed between the filter port and the chamber port when assembled. However, it will be understood that sealing elements other than an O-ring can be used to provide the fluid tight connection. It will also be understood that it is not necessary to provide a sealing element to provide the fluid tight connection. For example, the filter port and the chamber port can be shaped and sized, and the materials of them selected so as to provide a fluid tight interference fit between them when assembled.

Preferably, the sealing element is inclined relative to the first axis. Preferably, the angle of inclination of the sealing element is the same as the angle of inclination of the inclined surface. Inclining the sealing element is advantageous because the sealing element is gradually freed from between the filter port and the chamber port as the filter port is pushed out of the chamber port. Accordingly, the further the filter port is pushed out of the chamber port, the less stiction and friction there is between the sealing element and the chamber port, because less of the sealing element is in contact with the chamber port.

It is not necessary for the filter port to be pushed out of the chamber port so that the sealing element is not compressed between the filter port and the chamber port at any point, for the filter port to be free from the chamber port. This is because, the filter port can be free from the chamber port when only a part of the sealing element no longer extends between the filter and chamber ports. This is particularly the case when the sealing element is inclined relative to the first axis. Preferably, the inclined surface and the ejector part are configured so that, during separative rotation of the head and body parts, the filter port is pushed out of the chamber port so as to reduce the proportion of the sealing element that extends between the filter and chamber ports by at least 25%, more preferably at least 35%, especially preferably at least 50%. Accordingly, when the sealing element is an O-ring, preferably the inclined surface and the ejector part are configured so as to push the filter port out of the chamber port so that at least 25%, more preferably at least 35%, especially preferably at least 50% of the circumference of the O-ring is pushed out from compression between the filter and chamber ports.

The inclined surface can be provided by either the head part or the filter element. Preferably, the inclined surface is provided by the filter element.

The inclined surface can be provided by any part of the filter element that can contact the ejector part.

Preferably, the filter port is provided by a wall that projects from the filter element. Preferably, the inclined surface is provided by the wall of the filter port. This is advantageous as it avoids the need to provide the inclined surface on other parts of the filter element. Accordingly, providing the inclined surface on the wall of the filter port reduces the compactness of the filter element. The inclined surface can be provided by a protrusion that extends radially away from the wall of the filter port, at least part way around the wall of the filter port. The radially extending protrusion can extend annularly around the wall of the filter port. The radially extending protrusion can extend around the inner side of the wall of the filter port. The radially extending protrusion can extend around the outer side of the wall of the filter port.

Preferably, the inclined surface is provided by the free end of the wall of the filter port. The free end of the filter port is the end of the wall of the filter port which is most distal from the centre point of the filter element. This is advantageous because no extra formations need to be made on the wall of the filter port which might otherwise require modification of the chamber port to accommodate the filter port. Accordingly, preferably at least a part of the surface of the free end of the wall of the filter port is inclined relative to the first axis. More preferably, at least 50% of the perimeter of the surface of the free end is inclined relative to the first axis. Especially preferably, the whole of the free end of the wall of the filter port is inclined relative to the first axis.

The angle of inclination of the inclined surface can vary between its lowest and highest points. The lowest point of the inclined surface is that point of the inclined surface which is most proximal the centre point of the filter element, in a direction parallel to the first axis. The highest point of the inclined surface is that point of the inclined surface which is most distal the centre point of the filter element, in a direction parallel to the first axis. Preferably, the angle of inclination of the inclined surface is constant. This ensures that the amount by which the filter element is pushed away from the head part by the ejector part is constant for a given angle of rotation. Preferably, the inclined surface will lie in a plane. The inclined surface can be helical. A helical inclined surface can extend through 360°. It can however extend through less than 360°, for example up to about 270°, or up to about 180°.

When the inclined surface is helical, it can be preferred that the ejector part is provided by a complimentary inclined surface. Preferably, each of the inclined surfaces extends through an angle of at least about 300° around the axis of the assembly. Generally, the two inclined surfaces will extend through 360°. The end walls which mark the ends of the helices can function to limit the relative rotation between the filter element and the head part of the housing. The angular positions of the complimentary inclined surfaces should be matched to ensure that the filter element is properly seated within the housing head part when the head part and the body part of the housing are tightly connected to one another.

An ejector part which is provided by an inclined surface can be formed as a part of the housing head part rather than in a separate piece which is fitted into the housing head part.

Filter assemblies are often installed in confined locations where access is difficult. Accordingly, when replacing a filter element, it is advantageous to reduce the amount of work required to remove the filter element from the housing. Preferably, the wall of the filter port, chamber port and the angle of inclination of the inclined surface are configured so that the filter port can be freed from the chamber port by rotating the filter element by not more than 360°, more preferably by not more than 270°, especially preferably by not more than 180°. This ensures that the maintenance worker can remove the filter element from the housing without having to rotate the housing body through multiple revolutions, or even a whole revolution. As will be understood, the angle of inclination of the inclined surface to achieve this effect will depend on the features of the filter element and housing such as the dimensions of the filter port and the chamber port.

Preferably, the head and body parts of the housing engage one another by means of formations which comprise at least one ramp feature. The ramp feature can be provided by interengaging threads on the head and body parts respectively, in which each of the threads is a ramp. The ramp feature can be provided by a bayonet arrangement, in which a lug is engaged by a ramp.

Preferably, the pitch angle of the ramp (measured between the ramp and a plane which is perpendicular to the axis of the assembly) is at least about 1.5°, more preferably at least about 3°, for example at least about 5°. The pitch angle will generally be not more than about 20°, preferably not more than about 15°, more preferably not more than about 10°. This can provide beneficial control over the forces which are imposed in the housing, during assembly and especially disassembly.

Preferably, the angle between the inclined surface which engages the ejector part and the axis of the assembly is approximately the same as the pitch angle of the ramp. Minimising the difference between these angles can help to control the disengagement of the filter element from the housing head part as the head part is separated from the body part.

Preferably, the angle between the inclined surface which engages the ejector part and the axis of the assembly is at least about 10°, more preferably at least about 15°, especially at least about 20°, for example at least about 25°. Preferably, the angle between the inclined surface which engages the ejector part and the axis of the assembly is not more than about 50°, more preferably not more than about 45°, for example not more than about 40°.

The ejector part can be provided by either the head part or the filter element. Preferably, the ejector part is provided by the head part. The ejector part and the internal walls of the head part can be provided as one piece. This can be advantageous because the ejector part can be formed during the manufacture of the head part. For example, if the head part is made by a casting process, the ejector part can be formed during the casting process.

Preferably, the ejector part is provided toward the second end of the primary chamber. More preferably, the ejector part is provided within the primary chamber. Providing the ejector part in the primary chamber ensures that the ejector part will not interfere with the flow of fluid through the filter assembly once it has passed through the primary chamber.

The ejector part can be provided as a separate piece to the internal walls of the head part. Preferably, the ejector part is provided by an insert that is separate to the internal walls of the head part. Preferably, at least a portion of the insert is located in the primary chamber. Optionally, the insert can be removed from the primary chamber. This is advantageous because it can be easier to form the ejector part separately from the head part. It also enables different shaped and sized ejector parts to be inserted into a given head part. This can be advantageous when the head part can be used with different types of filter element having different dimensions, providing different inclined surfaces. The insert can include sealing surfaces by which it can be sealed to the head part, for example at or in the region of the port in the head part.

The ejector part can be provided by a protrusion which engages the inclined surface. The ejector part can be provided by an inclined surface so that the action of pushing the filter element away from the head part involves action of one inclined surface against another.

The primary chamber defines a flow conduit which fluid flows through between the at least one port in the head and the chamber port.

Preferably, the insert and primary chamber together define the flow conduit.

For example, the primary chamber can define a turn in the flow conduit between its first and second ends. In this case, optionally the insert to be can be inserted into the flow conduit at the turn so that the outer corner of the turn, distal the point about which the flow conduit turns, is defined by the internal walls of the head part and the inner corner of the turn, proximal the point about which the flow conduit turns, is defined by the insert.

Preferably, the insert comprises a tubular wall, at least a portion of the length of which can be inserted into the primary chamber, so that the primary chamber and the hollow space defined by the tubular wall together define the flow conduit for fluid to flow from the at least one port in the head and the filter port. Preferably, the ejector part is located between the tubular wall of the insert and the internal walls which define the primary chamber. This is advantageous because the ejector part will not be located in the flow conduit and so will not interfere with the flow of fluid through the flow conduit. Preferably, the ejector part is provided by the outer side of the tubular wall of the insert. The outer side is the side of the tubular that faces the internal walls which define the primary chamber when assembled.

Preferably, the wall of the filter port can extend into the space between the tubular wall of the insert and the internal wall of the head part so that the free end of the wall of the filter port which provides the inclined surface can engage the ejector part.

Preferably, the head part and the filter port have complementary keying formations, in the form of at least one recess and at least one projection, arranged so that the at least one projection can be received in the at least one recess, and so that the filter element can only be fully received in the head part when the at least one projection and the at least one recess are aligned. This is advantageous because the orientation of the filter element in the housing relative to the head part, is determined by the arrangement of the keying formations. Preferably, the complementary keying formations are configured so that the filter port can only be slid into the chamber port (or so that the chamber port can only be slid into the filter port) when the filter element and head part are orientated such that the ejector part will engage the highest point of the inclined surface. The complementary keying formations are configured so that once they can extend beyond each other when the filter port is received in the chamber port, the filter port and the chamber port can rotate relative to each other. Accordingly, the filter element can rotate relative to the head part, and because the ejector part initially engages the highest point of the inclined surface, the relative rotation will not cause the ejector part to act against the inclined surface and the bringing together of the head part and body part is allowed. Details of such a filter assembly are disclosed in the international application which claims priority from UK patent application no. 0715269.7 entitled Filter Assembly.

When the head part and the filter port have complementary keying formations, the inclined surface can be provided by the keying formations.

Preferably, the part of the filter assembly that provides the inclined surface is formed from a polymeric material. Preferably the ejector part is formed from a polymeric material. This is advantageous because the friction between the inclined surface and the ejector part can be less when at least one of them is formed from a polymeric material, when compared to other materials, such as certain metallic materials. The polymeric material can be reinforced by means of particulate or fibre materials, for example of glass or other mineral materials. Suitable polymeric materials include polyolefins, polyesters and polycarbonates. Particularly preferred materials include polyamides, especially filled with glass fibres.

The filter element can be used for removing compressor oil from a gas stream. Such filter elements are also known as coalescing filters. Coalescing filters are used to collect oil that is entrained in a gas stream by causing aerosol droplets of the oil to coalesce and collect as drops, which can flow as a liquid. They generally comprise several layers of filter media. For example, filter elements generally comprise a cylindrical filtration layer and a cylindrical anti-reentrainment barrier or a "drainage layer" surrounding the filtration layer on the outside of the filter element. The density and thickness of the media layers are selected according to, amongst other factors, the flow rate of the fluid stream, the level and nature of the impurities in the fluid stream, the level of impurity that is sought in the fluid stream after filtration.

Alternatively, the filter element can be a flow director positioned so that fluid flowing into the housing flows over the flow director so that the incoming fluid is made to follow a generally helical path within the housing. In this case, the filter assembly utilises centrifugal forces caused by a helically flowing fluid stream to separate contaminants, for example separating liquid droplets from a gas stream.

The filter element can be used to remove contaminants from a liquid stream, especially solid contaminants or quantities of immiscible liquids.

BRIEF DESCRIPTION OF THE DRAWINGS

Embodiments of this invention will now be described in further detail with reference to the accompanying drawings, in which.

DETAILED DESCRIPTION OF THE INVENTION

Figure 1:
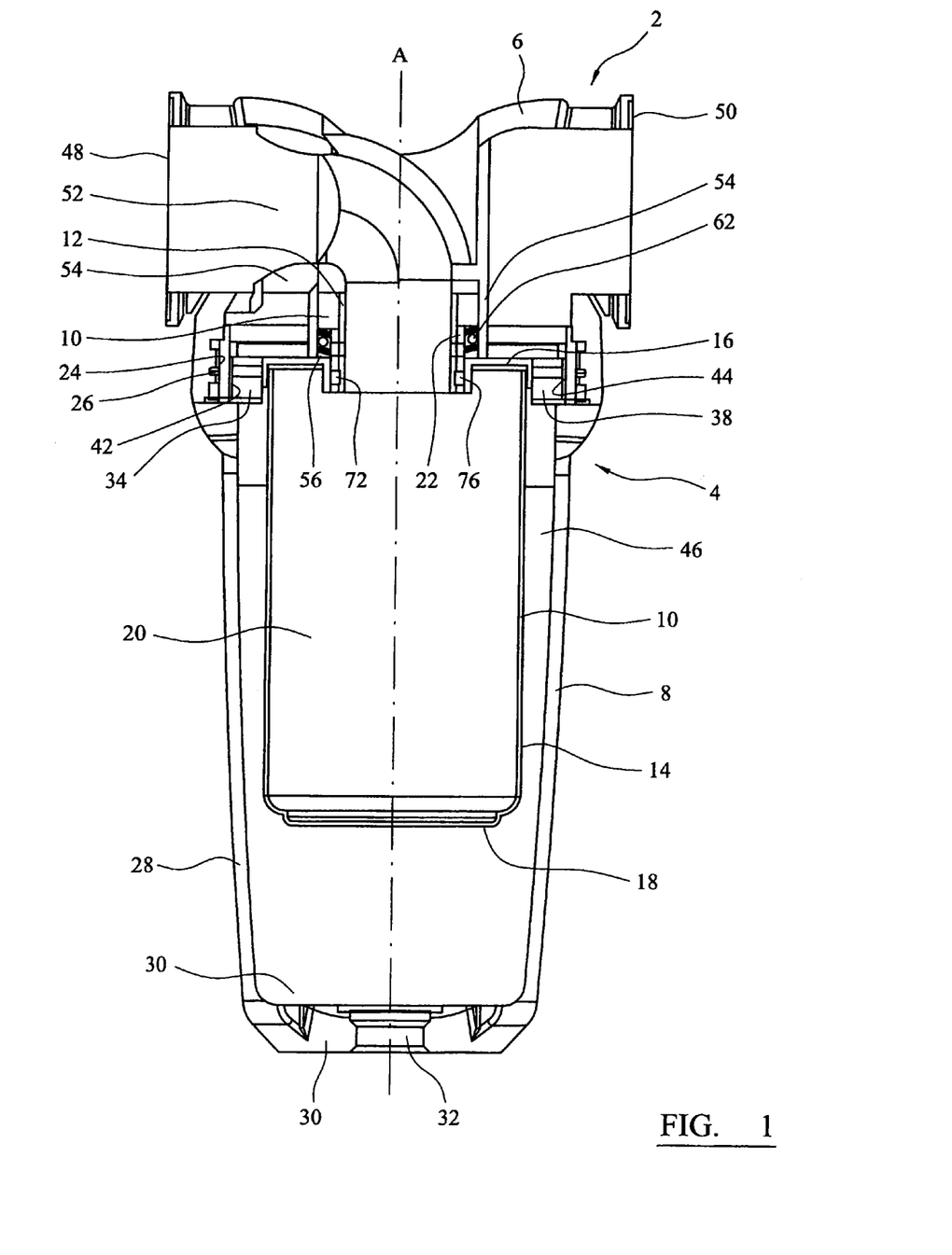
FIG. 1 is a sectional side view through a filter assembly according to the present invention which comprises a filter element and the housing in which the device is located when in use.

Referring to the drawings, FIG. 1 shows a filter assembly 2 which comprises a housing 4, having a head part 6 and a body part 8, a filter element 10, and a flow controller 12. The head 6 and body 8 parts each have engagement formations in the form of co-operating screw threads 24, 26 which allow the head 6 and body 8 parts to be connected to one another and separated by relative rotation about axis A. The head part 6 has a head axis and the body part 8 has a body axis, each of which are co-axial with the axis A.

Figure 2:
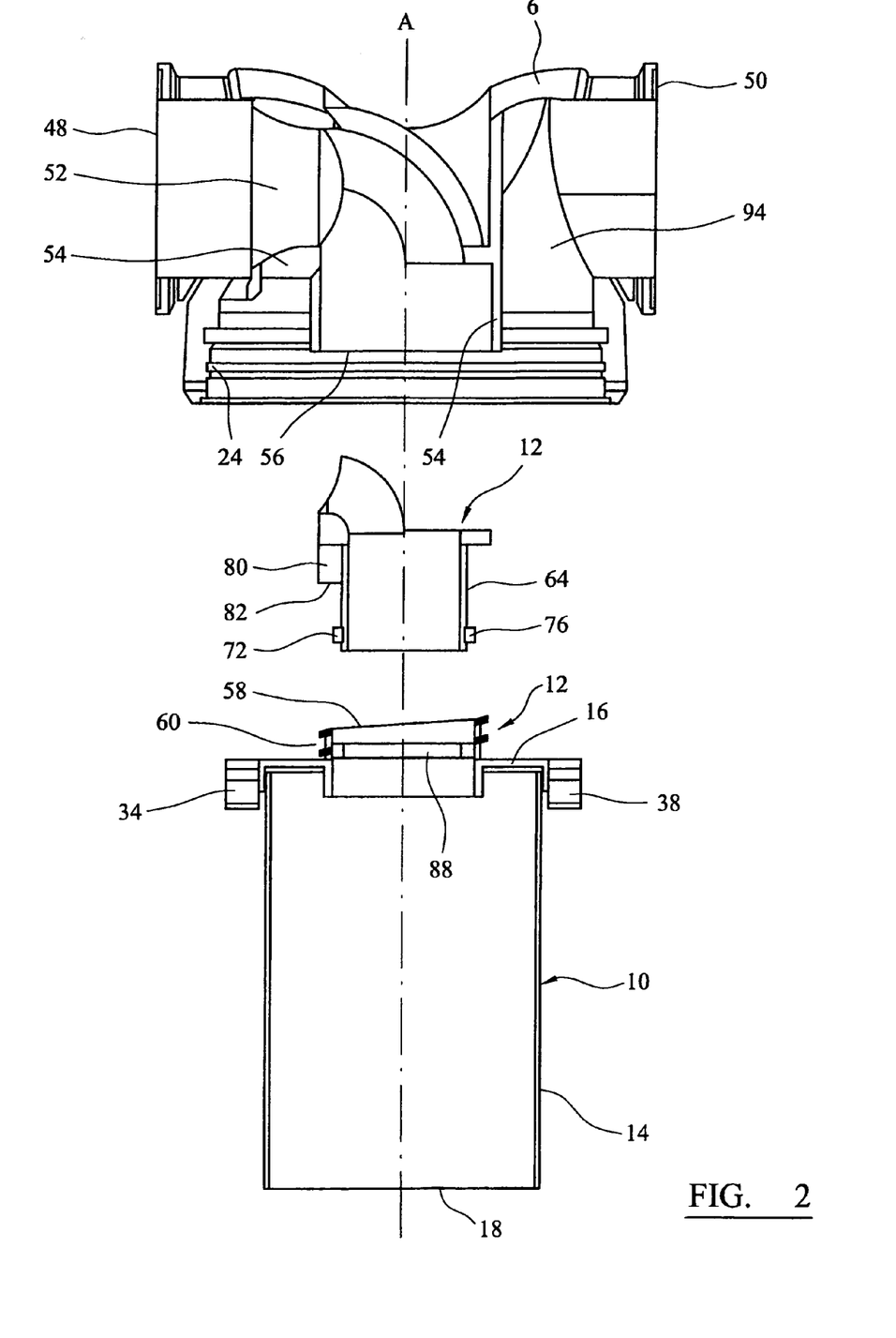
FIG. 2 is a sectional elevation of the filter assembly shown in FIG. 1, showing the head part of the housing, the filter element, and the flow controller of the filter assembly separated from each other.
Figure 3:
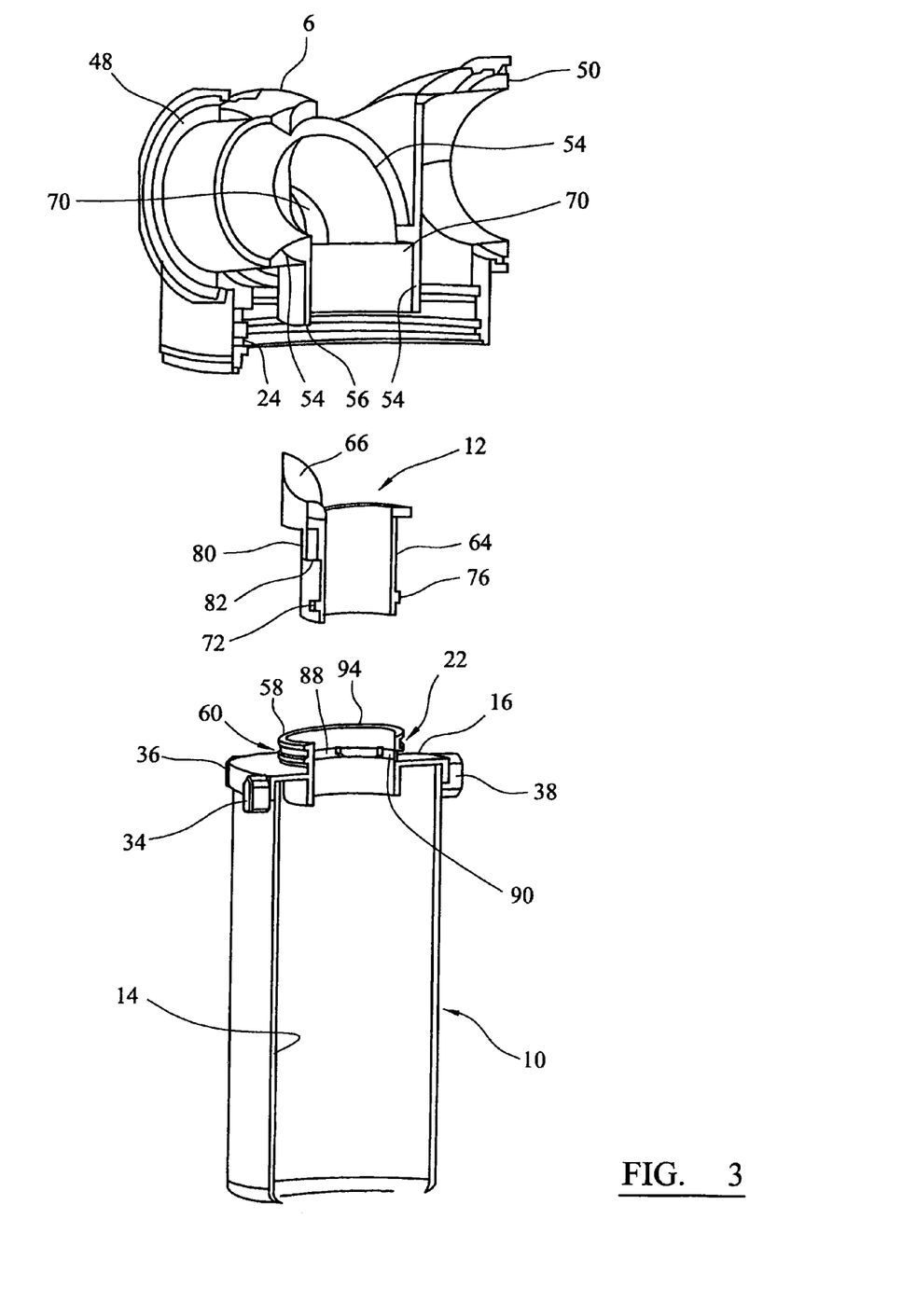
FIG. 3 is a sectional perspective view of the components shown in FIG. 2.
Figure 4:
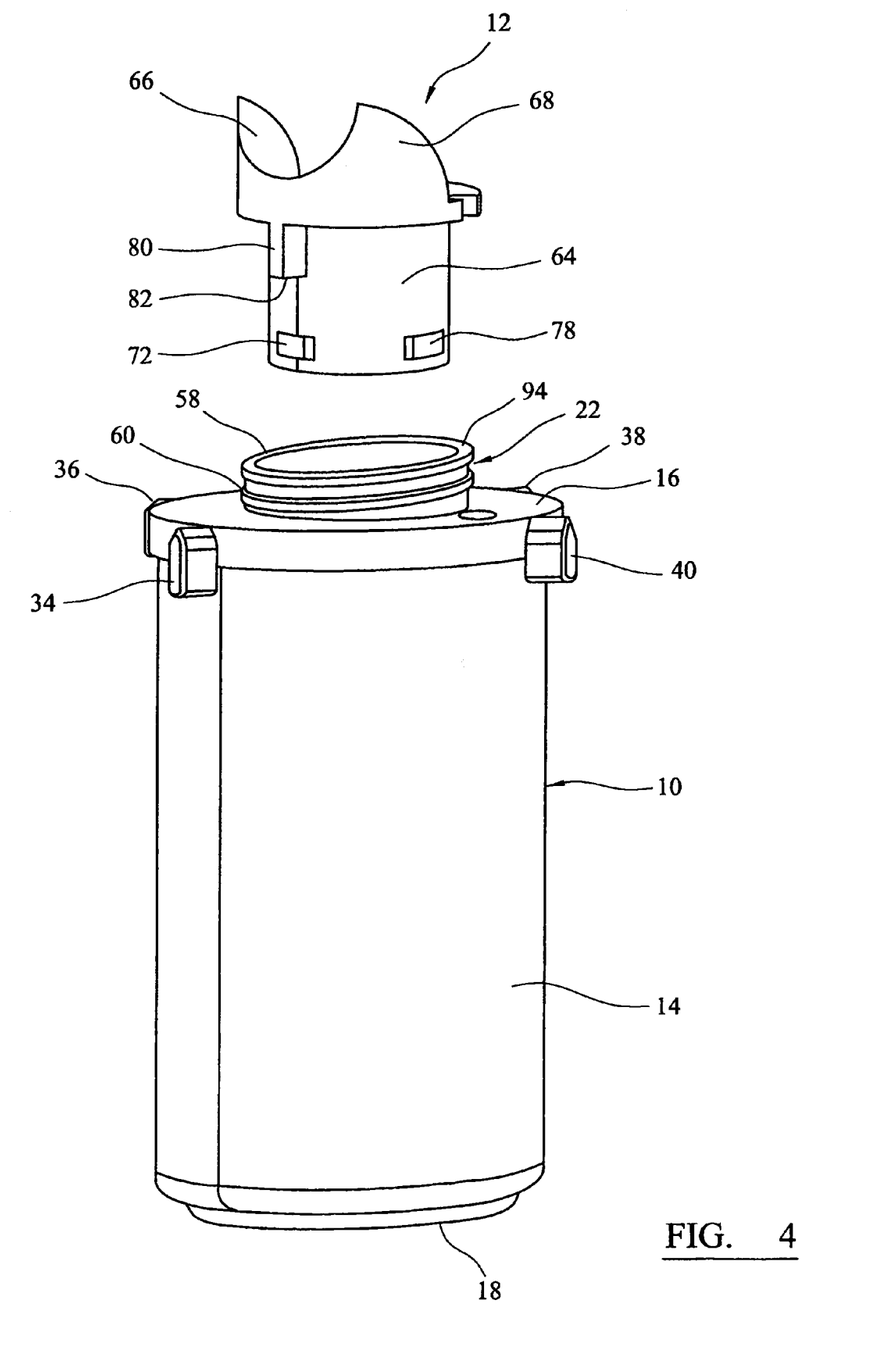
FIG. 4 is a perspective view of the flow controller and the filter element of the filter assembly shown in FIG. 1, separated from each other.

In the embodiment described, the filter element 10 is a filter element 10 which comprises a cylindrical wall section 14 formed from a filter medium, and top 16 and bottom 18 end caps. As best shown in FIGS. 2 to 4, the wall section 14 of the filter element 10 defines a hollow space 20 within it.

The top 16 and bottom 18 end caps are formed from a polymeric material. As will be understood, suitable polymeric materials include polyolefins (especially polyethylene and polypropylene), polyesters, polyamides, polycarbonates and the like. Optionally, the polymeric materials used for the flow deflector can be reinforced, for example by fibrous materials (especially glass fibres or carbon fibres). The top 16 and bottom 18 end caps are formed by injection moulding. It will be understood that materials other than polymeric materials can be used, for example metals.

The filter medium of the wall 14 comprises a cylindrical filtration layer and a cylindrical anti-reentrainment layer or drainage layer which fits snugly around the filtration layer on the outside of the filter element. Materials suitable for use as a filtration medium (or a filtration layer) include, borosilicate and other glass fibres, activated carbon minerals, activated silica materials and so on. Materials suitable for use as the drainage layer are used in similar products sold by Domnick Hunter Limited under the trade mark OIL-X. Suitable materials include open-celled foam plastics, felted fabric material, and expanded foam materials. The top and bottom parts of the wall section 14 are sealed to the top 16 and bottom 18 end caps respectively so that all fluid to be filtered flows through filter medium of the wall section 14.

The top end cap 16 has a filter port 22 by which fluid which is to be filtered can enter the hollow space 20 in the filter element 10. The filter port 22 projects from the top end cap 16 of the filter element 10, as is best shown in FIGS. 2 to 4. The angle between the free end 58 of the filter port 22 and the axis A is about 15°. Accordingly, the free end 58 provides an included surface 94 that is inclined relative to axis A. An annular recess 60 extends around the filter port 22. The annular recess 60 is inclined relative to the axis A by 15°. An O-ring 62 (shown in FIG. 1 only) is located in the annular recess 60.

Figure 5:
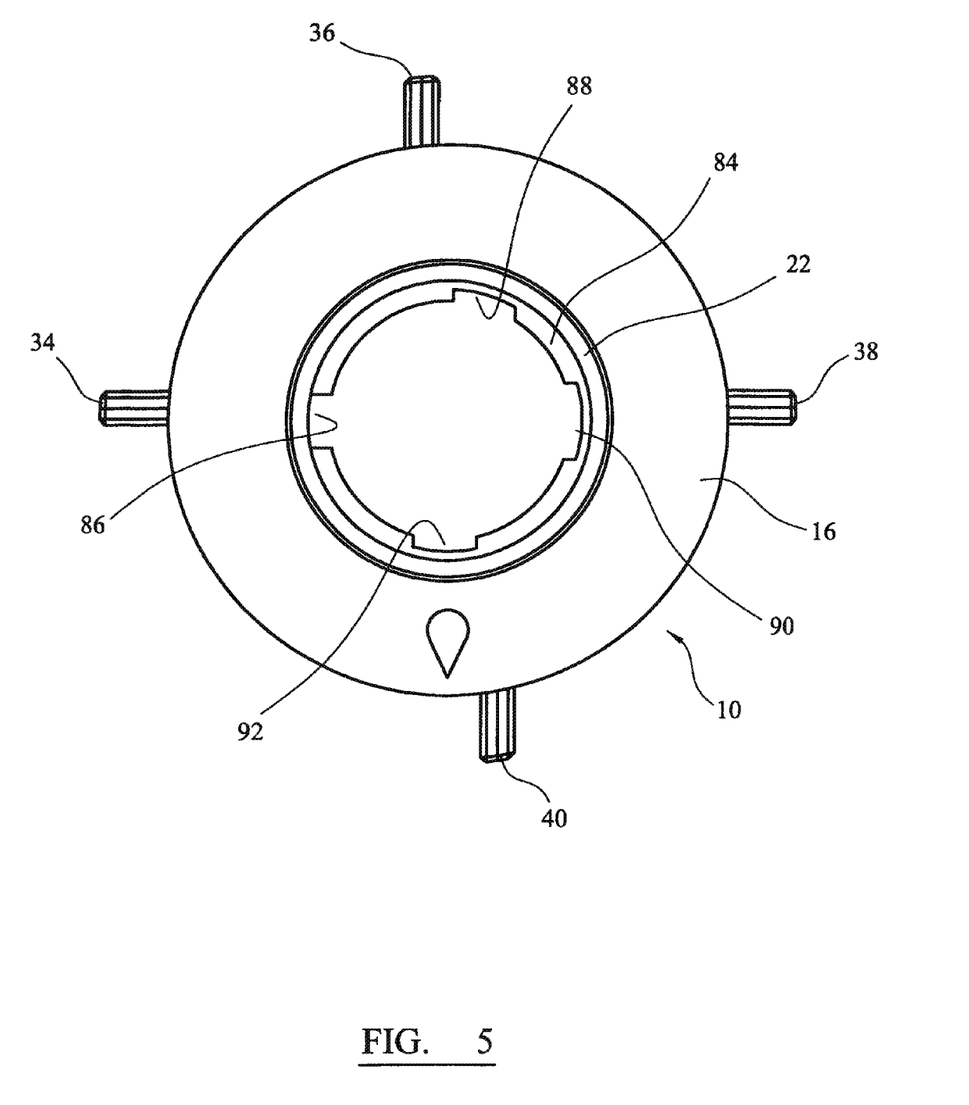
FIG. 5 is a top view of the filter element of the filter assembly shown in FIG. 1.

As best shown in FIG. 5, the inner side of the filter port 22 is provided with an annularly extending flange 84. The flange 84 has first 86, second 88, third 90 and fourth 92 recesses in it.

Figure 7:
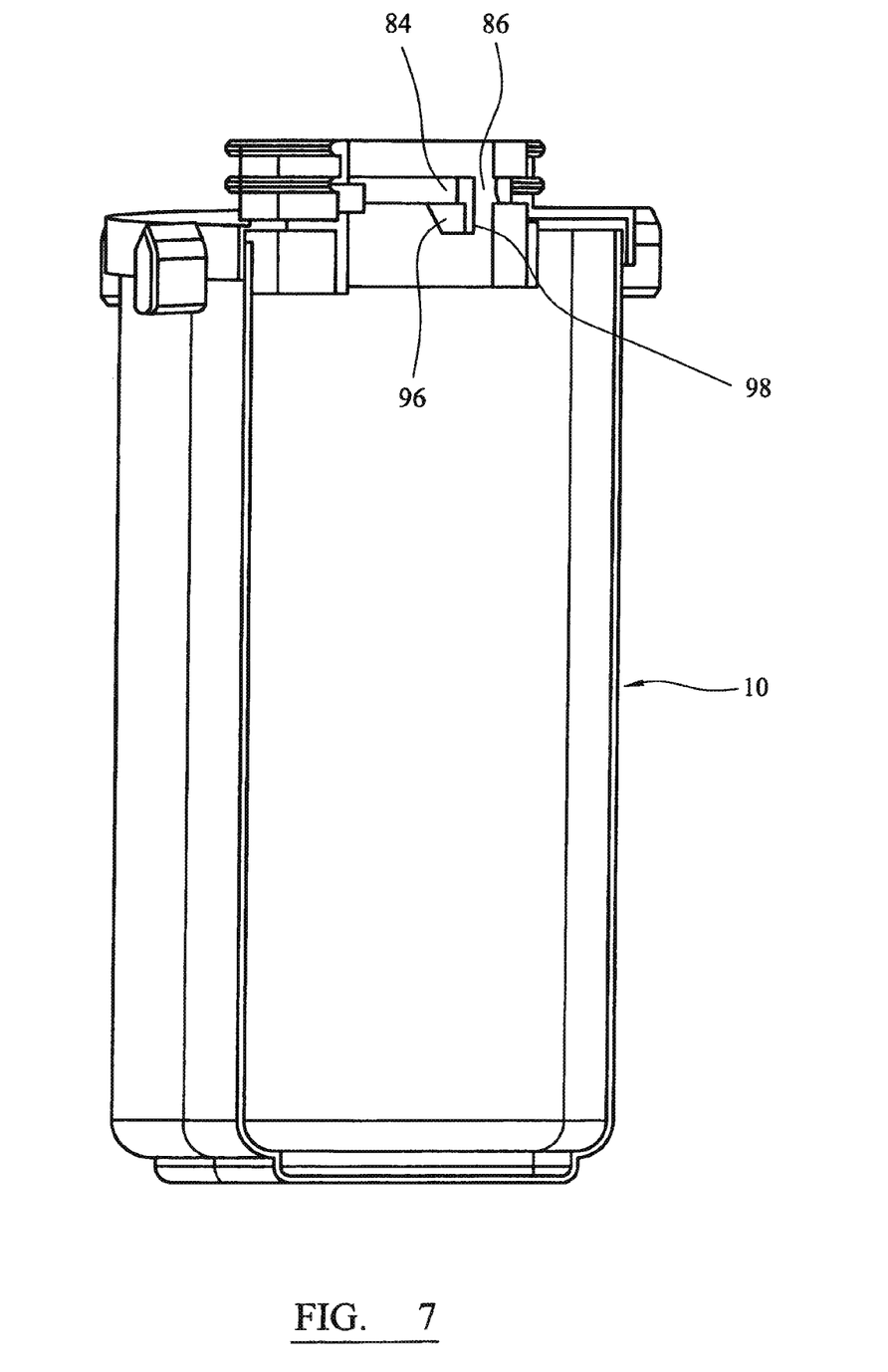
FIG. 7 is a cross-sectional perspective view of the filter element of the filter assembly shown in FIG. 1.

As best shown in FIG. 7, a stop member 96, in the form of a projection, is provided on the underside of the flange 84. An abutment surface 98 of the stop member 96 is located so that it is aligned with edge of the first recess 86.

The top end cap 16 also has first 34, second 36, third 38 and fourth 40 ribs around its perimeter that extend from the top end cap 16 towards the bottom end cap 18, on the exterior of the filter element 10. The ribs 34, 36, 38, 40 can engage corresponding grooves in the body part 8 to locate the filter element 10 in the body part 8 as described in more detail below.

The four ribs 34, 36, 38, 40 are spaced apart around the top end cap 16. The ribs 34, 36, 38, 40 are identical in shape size and configuration. The leading edge of the ribs 34, 36, 38, 40 (which is directed into the fluid stream when in use) is rounded and the trailing edge of the ribs 34, 36, 38, 40 is tapered inwardly, towards (optionally to) a sharp edge or point. The ribs 34, 36, 38, 40 are approximately aerofoil-shaped when viewed in cross-section (perpendicular to the axis of the assembly). This shape gives minimal resistance to the flow of fluid past the ribs.

FIG. 5 shows that the four ribs 34, 36, 38, 40 are not equally spaced around the top end cap 16. This is so that the filter element 10 can be received in the body part 8 in one rotational orientation only.

The flow controller 12, has a tubular part 64 having first and second ends, and first 66 and second 68 wing members extending from the first end of the tubular part 64 that together define a corner of an open tube. In the embodiment shown, the tubular part 64, and first 66 and second 68 wing members are formed as a single piece. First 72, second 74, third 76 and fourth 78 male keying formations protrude radially from the tubular part 64 of the flow controller 12, and are located toward the second end of the tubular part 64.

The flow controller 12 also has an ejector part 80, in the form of a projection extending radially from the tubular part 64, and is located toward the first end of the tubular part 64. The ejector part 80 presents a flat surface 82 facing the second end of the tubular part 64.

The housing comprises a head part 6 and a body part 8 which can be connected to one another by means of cooperating screw threads at their interfaces 24, 26. The head part 6 and body part 8 are formed from a metallic material, especially aluminium or an alloy thereof. They can be formed by machining, or by techniques such as casting.

The body part 8 comprises a cylindrical wall 28, an end wall 30 at one end of the cylindrical wall, and an open end at the opposite end of the cylindrical wall. First 42, second (not shown), third 44 and fourth (not shown) grooves are provided in the interior of the body part 8 at the open end. The first 42, second, third 44 and fourth grooves are shaped, sized and located so that they can slidingly receive the first 34, second 36, third 38 and fourth 40 ribs, respectively, as described in more detail below.

The body part 8 defines a space within which the filter element 10 is coaxially located when in use. Liquid drops which drain from the drainage layer of the filter element 10 in use are collected in a reservoir 30 in the housing body. The housing includes a drain outlet 32, for example of the kind which is disclosed in EP-A-81826.

The head part 6 includes an inlet port 48 for fluid to be filtered to enter the filter assembly 2, and an outlet port 50 through which fluid which has passed through the wall 14 of the filter element 10 can be supplied to a downstream application.

The head part 6 also includes internal walls 54 which are formed as one piece with the head part 6, and which define a primary chamber 52. The primary chamber 52 communicates with the inlet port 48 at a first end and a chamber port 56 at its second end. The chamber port 56 is coaxial with the axis about which the head part 6 rotates relative to the body part 8 during assembly and disassembly as discussed in more detail below. The internal walls 54 are provided with recesses 70 towards the second end of the primary chamber 52 into which the tubular part 64 and the first and second 68 wing members of the flow controller 12 can be received.

The filter assembly 2 is assembled by sliding the flow controller 12 into the head part 6 conduit 52 through the chamber port 56 until it is fully received in the recesses 70 in the primary chamber 52. The recesses 70 are shaped and sized so that the first 66 and second 68 wing members and the tubular part 64 of the flow controller 12 are a snug fit within the recesses. When the flow controller 12 is fully received in the head part 6, the flow controller 12 and the internal walls 54 together define the path will take when entering the filter element as described in more detail below.

The filter element 10 is assembled in the body part 8 by co-locating the first 34, second 36, third 38 and fourth 40 ribs with the first 42, second, third 44 and fourth grooves of the body part 8, and then sliding the ribs into the grooves until they sit on the bottom of the grooves. Once the ribs 34, 36, 38, 40 have been fully received by the grooves 42, 44 the filter element 10 is securely suspended within the body part 8. Therefore, as will be appreciated, the axial position of the filter element 10 within the body part 8 can be controlled by the shape and size of the ribs 34, 36, 38, 40 and grooves 42, 44. Further, rotation of the filter element 10 relative to the body part 8 is inhibited by the interlocking of the ribs 34, 36, 38, 40 with the grooves 42, 44.

Once the filter element 10 is appropriately assembled in the body part 8, an annular space 46 is defined between the filter element 10 and the cylindrical wall 28 of the body part 8. The filter element 10 can be removed from the body part 8, by pulling the filter element 10 away from the body part 8 along its axis.

Figure 6:
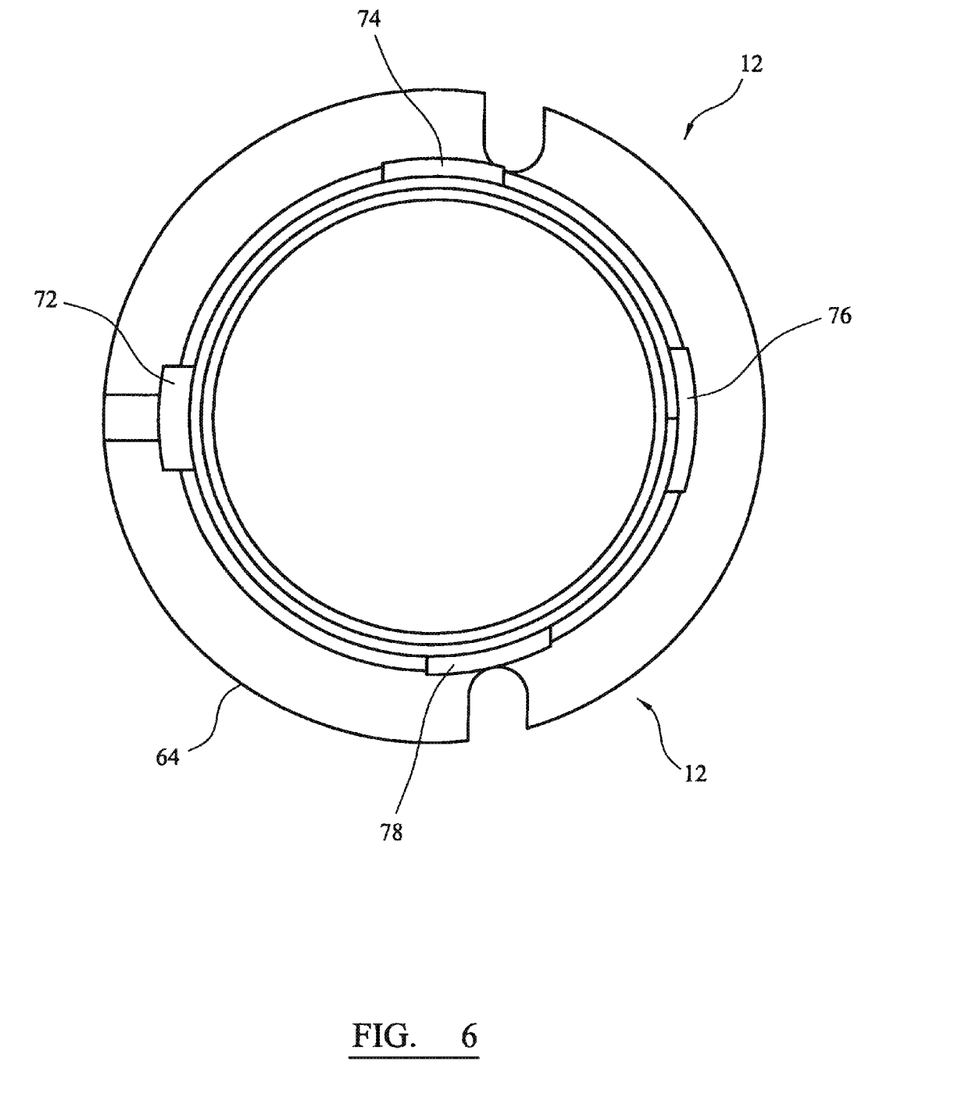
FIG. 6 is a bottom view of the flow controller of the filter assembly shown in FIG. 1.

The body part 8 and head part 6 are then initially assembled by locating the filter port 22 of the filter element 10 in the chamber port 56 of the head part 6, so that the male formations 72, 74, 76, 78 on the tubular part 64 of the flow controller 12 are received within the recesses 86, 88, 90, 92 in the flange 84 on the filter port 22. Due to the shape and configuration of the recesses 86, 88, 90, 92 and the male formations 72, 74, 76, 78, the male formations 72, 74, 76, 78 can only be received in the recesses 86, 88, 90, 92 when the head and body axes are aligned and only when the recesses 86, 88, 90, 92 and the male formations 72, 74, 76, 78 are co-located. As is shown in FIGS. 5 and 6, the recesses 86, 88, 90, 92 and the male formations 72, 74, 76, 78 are not spaced apart equally around the flange 84 and tubular member 64. This is so that the male formations 72, 74, 76, 78 can pass past the recesses 86, 88, 90, 92, and so that filter port 22 can only be fully received in the chamber port 56, in one rotational orientation only. Further, due to the male formations 72, 74, 76, 78 being a snug fit within the recesses 86, 88, 90, 92 the head 6 and body 8 parts cannot be rotated relative to each other when they are in the initial assembly position.

Once in the initial assembly position, the head 6 and body 8 parts can be moved to the fully assembled position by pushing them together. The head 6 and body 8 parts are in the fully assembled position once the male formations 72, 74, 76, 78 are no longer received in the recesses 86, 88, 90, 92, so that the head 6 and body 8 parts can be rotated relative to each other so that the cooperating screw threads 24, 26 can engage each other. Accordingly, once in the fully assembled position, the head part 6 and body part 8 can then be secured by rotating one relative to the other so that their cooperating screw threads at their interfaces 24, 26, are tightened to interlock with each other. As discussed above, the keying formations are arranged such that the male formations 72, 74, 76, 78 can only pass past the recesses 86, 88, 90, 92 when the head and body axes are co-axial. Accordingly, once the male formations 72, 74, 76, 78 have passed past the recesses 86, 88, 90, 92, the head 6 and body 8 parts will be orientated so that the co-operating screw threads at their interfaces 24, 26 are properly aligned.

When the head part 6 is secured to the body part 8, the O-ring 62 on the outer side of the filter port 22 is compressed between the filter port 22 and the internal walls 54 of the head part at the chamber port 56 end of the primary chamber 52 to form a fluid tight seal. Also, when the head part 6 is fully secured to the body part 8, the ejector part 80 and the free end 58 of the filter port 22 are configured such that the flat surface 82 of the ejector part 80 engages the inclined surface 94 of the free end 58 of the filter port 22 at its lowest point, that is the point of the inclined surface 94 that is most proximal the top end cap 16 of the filter element 10.

When the filter assembly 2 is assembled, the outlet port 50 communicates with the annular space 46 between the wall 14 of the filter element 10 and the cylindrical wall of the body part 8.

The filter assembly can be disassembled by rotating the body part 8 relative to the head part 6 so that their cooperating screw threads are loosened. Any rotational force that is imparted on the top end cap 16 of the filter element 10 by stictional forces between the O-ring 62 and the internal walls 54 of the head part 6 is negated by the opposite rotational drive that is provided by the ribs 34, 36, 38, 40 acting against the grooves 42, 44 in the body part 8 in which the ribs are received. Therefore, as the body part 8 is rotated relative to the head part 6, the filter element 10 also rotates with the body part 8 relative to the head part 6. Accordingly, the filter port 22 will rotate relative to the ejector part 80 and as it does so, the flat surface 82 of the ejector part 80 will engage inclined surface 94 and push the filter port 22 away from the ejector part 80.

The angle of inclination of the inclined surface 94, and the dimensions of the filter port 22, head part 6 and ejector part are such that when the filter port 22 has been rotated by 180° relative to the ejector part 80, the filter port 22 has been pushed away from the ejector part by an amount sufficient to push 50% of the circumferential length of the O-ring 62 out of the chamber port 56 so that the lower portion of the inclined O-ring is no longer compressed between the internal walls 54 of the head part 6 and the filter port 22. Accordingly, there will then be sufficiently small frictional engagement between the filter port 22 and the internal walls 54 of the head part 6 for the filter port 22 to be able to drop out of the chamber port 56 under the weight of the filter element 10 alone. Accordingly, the filter port 22 will be free from the chamber port 56.

Therefore, as the body part 8 is rotated relative to the head part 6, the filter element 10 will tend to reside in the body part 8 rather than be drawn away from the body part 8 with the head part 6.

The body part 8 and head part 6 can continue to rotate relative to each other so as to separate the body and head parts, until one of the projections 72, 74, 76, 78 abuts the abutment surface 98 of the stop member 96. At this point, the projections 72, 74, 76, 78 will be aligned with their corresponding recess 86, 88, 90, 92 so the body part 8 and filter element 10 can be drawn away from the head part 6.

In use, a fluid that is to be filtered enters the filter assembly 2 through the inlet port 48 in the head part 6 and is directed to the hollow space 20 in the filter element 10 by means of the primary chamber 52 defined by the internal walls 54 and the flow controller 12 in the head part 6.

From the hollow space 20, the fluid flows generally radially outwardly through the filter medium of the wall 14. Any liquid contaminants in a gas stream will be coalesced by the filtration layer and any coalesced liquid will be carried to the drainage layer by the flow of gas, where the liquid will be retained. The liquid will tend to drain to the bottom of the drainage layer, where it can tend to accumulate toward the bottom of the drainage layer, thereby forming a wet band. When that part of the drainage layer becomes sufficiently saturated, the liquid will begin to drain from any exposed parts of that part of the drainage layer, generally in the form of drops.

Filtered fluid exiting the filter element 10 enters the annular space 46 between the filter element 10 and the cylindrical wall 28. Filtered fluid is then discharged from the filter assembly through the outlet port 50 in the housing head 52, which is in fluid communication with the annular space 46.

Figure 8:
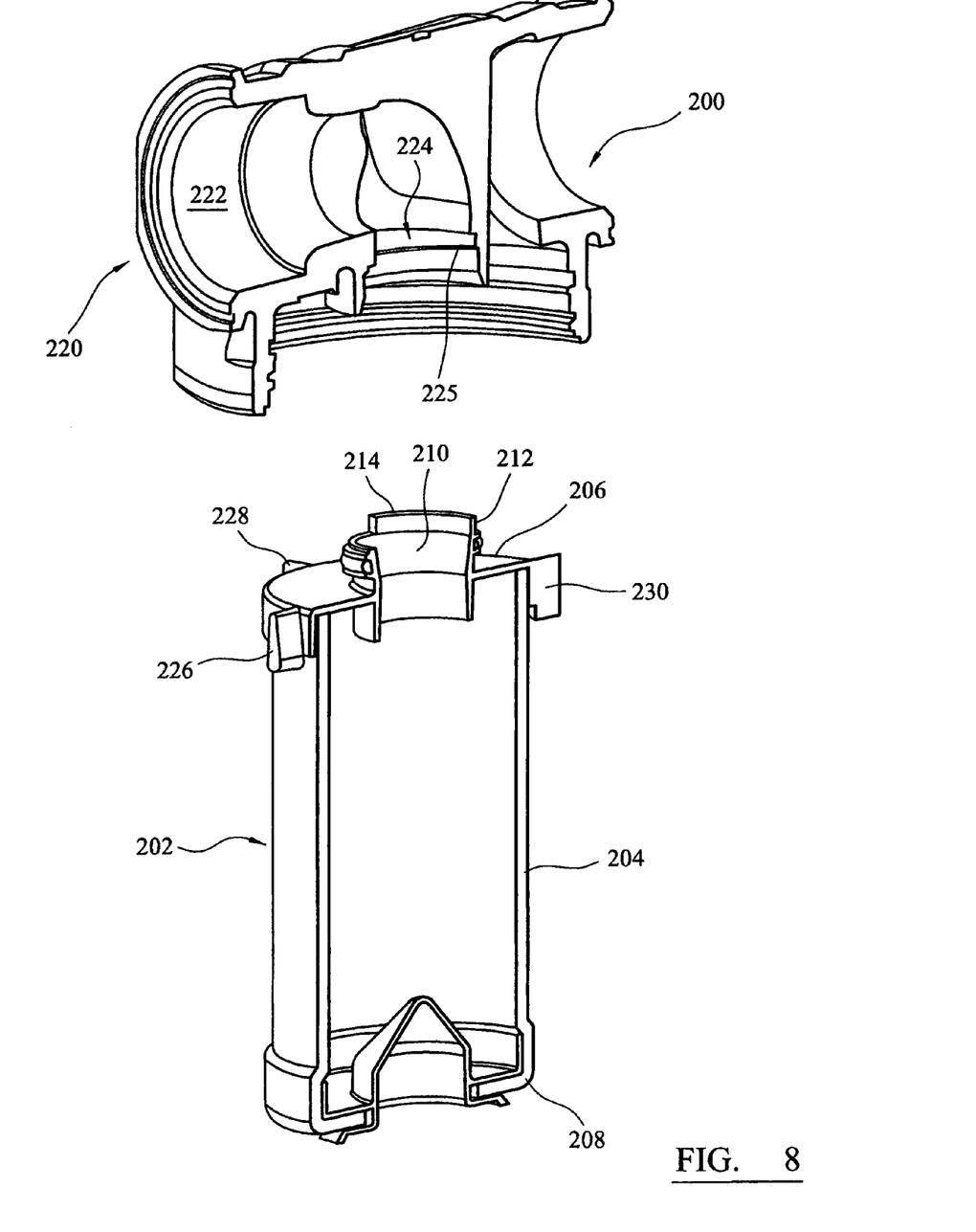
FIG. 8 is a sectional elevation of another embodiment of the filter assembly, showing the head part of the housing and the filter element separated from each other.

FIG. 8 shows another embodiment of filter assembly 200. The drawing shows the filter element 202 of the assembly and the head part 220 of the housing. The filter element comprises a wall section 204 and top and bottom end caps 206, 208.

The top end cap 206 has a filter port 210 formed in it defined by a wall 212. Fluid which is to be filtered can enter the hollow space within the filter element through the port 210.

The free end 214 of the port extends helically, inclined to the axis of the device. The angle between the free end of the port and the axis of the device is about 20°.

The head part 220 of the housing has an inlet port 222 which communicates with a chamber port 224 which is aligned with the axis of the assembly. A helical ejector surface 225 is provided within the chamber port, extending 360° around the assembly axis.

Figure 9:
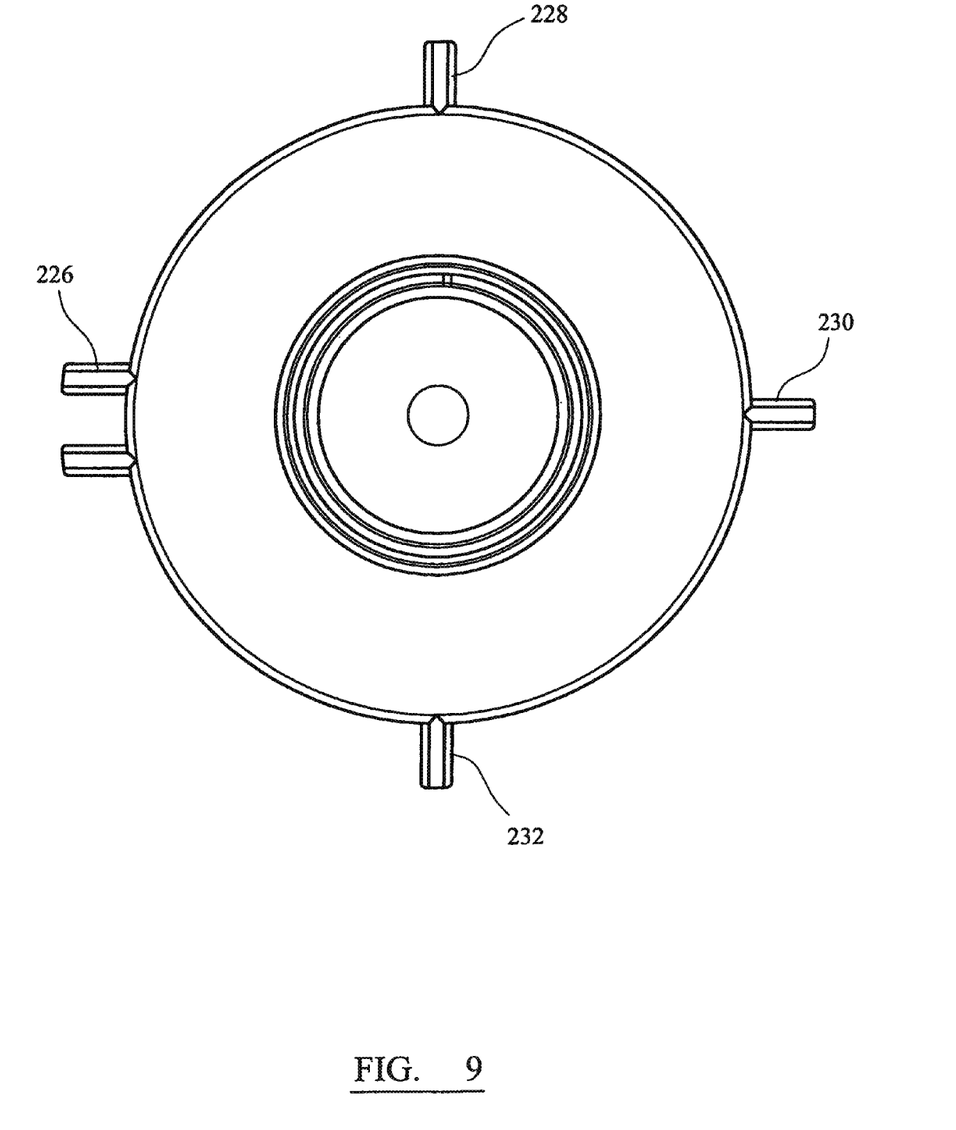
FIG. 9 is a top view of another embodiment of filter element.

As shown in FIG. 9, the top end cap of the filter element has four ribs 226, 228, 230, 232 spaced apart around its periphery, spaced apart approximately equally. One of the ribs 226 is provided in the form of a pair of spaced apart riblets.

The filter element 202 is assembled in the body part of a housing by locating the ribs 226, 228, 230, 232 in respective grooves in the body part of a housing, in which the grooves are sized so that the ribs are a tight sliding fit, with one of the grooves being wider than the other grooves so as to accommodate the rib 226 which is provided in the form of a pair of spaced apart riblets. The ribs are slid into the grooves until they sit on the bottom of the grooves. Once the ribs have been fully received by the grooves the filter element 202 is securely suspended within the body part. Relative rotation of the filter element 202 relative to the body part is prevented by the interlocking of the ribs 226, 228, 230, 232 with the grooves in the body part.

Once the filter element 202 is appropriately assembled in the body part of a housing, an annular space is defined between the filter element and the cylindrical wall of the body part. The filter element 202 can be removed from the body part by pulling the filter element away from the body part along its axis.

The body part and head part 220 are then initially assembled by locating the filter port 210 of the filter element 202 in the chamber port 224 of the head part so that the helical surface provided by the free end 214 of the port 210 is offered towards the helical ejector surface in the chamber port. Assembly of the body part and the head part involves action of the cooperating threads on the two parts. Relative rotation between the body part and the head part causes the two parts to be drawn together. During such relative rotation, the helical surfaces, on the free end of the port and provided by the ejector surface in the chamber port respectively, allow the filter element to be displaced towards the head part of the housing, with the filter port 210 being received in the chamber port in the housing.

When the head part 220 is secured to the body part, an O-ring 221 in a peripheral groove on the outside of the filter port 210 is compressed between the filter port 210 and the internal walls of the head part at the chamber port 224 to form a fluid tight seal.

The filter assembly can be disassembled by rotating the body part relative to the head part so that their cooperating screw threads are loosened. The filter element turns with the body part as a result of the receipt in grooves in the body part of the ribs on the top end cap of the device. Therefore, as the body part is rotated relative to the head part, the filter element also rotates with the body part relative to the head part. Accordingly, the filter port 210 will rotate relative to the helical ejector surface 225 and, as it does so, the action of the helical ejector surface 225 against the free end 214 of the port 210 will cause the filter port to be ejected from within the chamber port.

What is claimed is:

1. A filter assembly for removing material entrained in a fluid stream, comprising:
   a housing having a head part and a body part, and inlet and outlet ports for the fluid that is to be filtered, in which at least one of the ports is provided in the head part, the head part having a chamber port fluidly connected to the at least one port in the head part, the head and body parts having first formations which enable them to be connected to one another and separated by relative rotation;
   a filter element for removing material entrained in the fluid stream that can be received in the body part, the filter element having outwardly extending ribs which are slidingly received in corresponding grooves in the body part when the filter element is assembled into the body part, the engagement between the ribs and the grooves restricting relative rotation between the filter element and the body part and allowing the filter element to be separated from the body part by lifting it out axially, the filter element having a filter port, in which the assembly includes a compressible O-ring which is positioned between the filter port and the chamber port to provide a fluid tight connection between the filter port and the chamber port by sliding one of them into the other along a first axis;

in which one of the head part and the filter element provides an inclined surface which is inclined relative to the first axis, and extends helically at least part way around the axis of the assembly, and the other provides an ejector part which acts against the said inclined surface so as to push the filter element away from the head part as the head part and the body part are separated by relative rotation, so as to free the filter port from the chamber port.

2. A filter assembly as claimed in claim 1, in which the inclined surface is provided by the filter element.

3. A filter assembly as claimed in claim 2, in which the filter port is provided by a wall which projects from the filter element, and in which the inclined surface is provided by the free end of the filter port wall.

4. A filter assembly as claimed in claim 1, in which the inclined surface lies in a plane.

5. A filter assembly as claimed in claim 4, in which the filter port, chamber port and the angle of inclination of the inclined surface are configured so that the filter port can be freed from the chamber port by rotating the filter element by not more than 270°.

6. A filter assembly as claimed in claim 4, in which the filter port, chamber port and the angle of inclination of the inclined surface are configured so that the filter port can be freed from the chamber port by rotating the filter element by not more than 180°.

7. A filter assembly as claimed in claim 1, in which the ejector part is provided within a primary chamber at its second end.

8. A filter assembly as claimed in claim 1, in which the ejector part is provided by an internal wall of the head part.

9. A filter assembly for removing material entrained in a fluid stream, comprising:

a housing having a head part and a body part, and inlet and outlet ports for the fluid that is to be filtered, in which at least one of the ports is provided in the head part, the head part having a chamber port fluidly connected to the at least one port in the head part, the head and body parts having first formations which enable them to be connected to one another and separated by relative rotation;

a filter element for removing material entrained in the fluid stream that can be received in the body part, the filter element having outwardly extending ribs which are slidingly received in corresponding grooves in the body part when the filter element is assembled into the body part, the engagement between the ribs and the grooves restricting relative rotation between the filter element and the body part and allowing the filter element to be separated from the body part by lifting it out axially, the filter element having a filter port, in which the assembly includes a compressible O-ring which is positioned between the filter port and the chamber port to provide a fluid tight connection between the filter port and the chamber port by sliding one of them into the other along a first axis;

in which one of the head part and the filter element provides an inclined surface which is inclined relative to the first axis and extends helically at least part way around the axis of the assembly, and the other provides an ejector part which acts against the said inclined surface so as to push the filter element away from the head part as the head part and the body part are separated by relative rotation, so as to free the filter port from the chamber port, in which the ejector part is provided by a surface within the head part which extends helically at least part way around the assembly axis.

10. A filter assembly for removing material entrained in a fluid stream, comprising:

a housing having a head part and a body part, and inlet and outlet ports for the fluid that is to be filtered, in which at least one of the ports is provided in the head part, the head part having a chamber port fluidly connected to the at least one port in the head part, the head and body parts having first formations which enable them to be connected to one another and separated by relative rotation;

a filter element for removing material entrained in the fluid stream that can be received in the body part, the filter element having outwardly extending ribs which are slidingly received in corresponding grooves in the body part when the filter element is assembled into the body part, the engagement between the ribs and the grooves restricting relative rotation between the filter element and the body part and allowing the filter element to be separated from the body part by lifting it out axially, the filter element having a filter port, in which the assembly includes a compressible O-ring which is positioned between the filter port and the chamber port to provide a fluid tight connection between the filter port and the chamber port by sliding one of them into the other along a first axis;

in which one of the head part and the filter element provides an inclined surface which is inclined relative to the first axis, and extends helically at least part way around the axis of the assembly, and the other provides an ejector part which acts against the said inclined surface so as to push the filter element away from the head part as the head part and the body part are separated by relative rotation, so as to free the filter port from the chamber port, in which the inclined surface extends helically at least part way around the assembly axis, and in which the ejector part is provided by a further inclined surface, which extends helically at least part way around the assembly axis.

11. A filter assembly for removing material entrained in a fluid stream, comprising:

a housing having a head part and a body part, and inlet and outlet ports for the fluid that is to be filtered, in which at least one of the ports is provided in the head part, the head part having a chamber port fluidly connected to the at least one port in the head part, the head and body parts having first formations which enable them to be connected to one another and separated by relative rotation;

a filter element for removing material entrained in the fluid stream that can be received in the body part, the filter element having outwardly extending ribs which are slidingly received in corresponding grooves in the body part when the filter element is assembled into the body part, the engagement between the ribs and the grooves restricting relative rotation between the filter element and the body part and allowing the filter element to be separated from the body part by lifting it out axially, the filter element having a filter port, in which the assembly includes a compressible O-ring which is positioned between the filter port and the chamber port to provide a fluid tight connection between the filter port and the chamber port by sliding one of them into the other along a first axis;

in which one of the head part and the filter element provides an inclined surface which is inclined relative to the first axis, and extends helically at least part way around the axis of the assembly, and the other provides an ejector part which acts against the said inclined surface so as to push the filter element away from the head part as the head part and the body part are separated by relative rotation, so as to free the filter port from the chamber port, in which the head part includes an insert, formed separately from the head part, in which the insert is located in the primary chamber, and in which the ejector part is provided by the insert.

12. A filter element locatable within a housing having a head part and body part, for removing material entrained in a fluid stream, the filter element comprising:

a cylindrical filter medium with first and second end caps, and defining an interior space circumscribing a central axis; one of the end caps having radially outwardly extending ribs which can be slidingly received in corresponding grooves in the body part when the filter element is assembled into the body part, the engagement between the ribs and the grooves restricting relative rotation between the filter element and the body part and allowing the filter element to be axially separated from the body part, the one end cap also having a filter port which can be sealingly connected to a chamber port in the body part, and a compressible O-ring, carried by and surrounding the filter port, and circumscribing an axis which is offset from the central axis;

the one end cap of the filter element further having an inclined surface which is inclined relative to the central axis and which extends helically at least part way around the axis of the filter element, and which can cooperate with an ejector part in the head part which acts against the inclined surface so as to push the filter element away from the head part when the head part and the body part are separated by relative rotation, so as to free the filter port from the chamber port.

13. The filter element as in claim 12, wherein the inclined surface circumscribes the filter port.

14. The filter element as in claim 13, wherein the ribs are located in spaced relation around the one end cap, and each rib extends axially along the filter medium and has a rounded leading edge and a tapered trailing edge.

15. A filter element locatable within a housing having a head part and a body part, for removing material entrained in a fluid stream, the filter element comprising:

a cylindrical filter medium with first and second end caps, and defining an interior space circumscribing a central axis; one of the end caps having radially outwardly extending formations which can be slidingly received in corresponding grooves in the body part when the filter element is assembled into the body part, the engagement between the formations restricting relative rotation between the filter element and the body part and allowing the filter element to be axially separated from the body part, the one end cap also having a filter port, which can be sealingly connected to a chamber port in the body part; and a compressible O-ring carried by and surrounding the filter port and which circumscribes an axis which is offset from the central axis;

the one end cap of the filter element further having an inclined surface which is inclined relative to the central axis and which extends helically at least part way around the axis of the filter element, and which can cooperate with an ejector part in the head part which acts against the inclined surface so as to push the filter element away from the head part when the head part and the body part are separated by relative rotation, so as to free the filter port from the chamber port.

16. The filter element as in claim 15, wherein the inclined surface circumscribes the filter port.

* * * * *